(12) United States Patent
Pouyau et al.

(10) Patent No.: US 9,709,002 B2
(45) Date of Patent: Jul. 18, 2017

(54) METHOD OF MIXING BETWEEN A PRIMARY FLOW AND A SECONDARY FLOW IN A TURBINE ENGINE, CORRESPONDING DEVICE AND TURBINE ENGINE

(71) Applicant: SNECMA, Paris (FR)

(72) Inventors: Guillaume Pouyau, Paris (FR); Nicolas Sirvin, Brunoy (FR)

(73) Assignee: SNECMA, Paris (FR)

( * ) Notice: Subject to any disclaimer, the term of this patent is extended or adjusted under 35 U.S.C. 154(b) by 696 days.

(21) Appl. No.: 14/178,584

(22) Filed: Feb. 12, 2014

(65) Prior Publication Data

US 2014/0234074 A1 Aug. 21, 2014

(30) Foreign Application Priority Data

Feb. 18, 2013 (FR) ...................... 13 51379

(51) Int. Cl.
*F02K 1/38* (2006.01)

(52) U.S. Cl.
CPC ...... *F02K 1/386* (2013.01); *F05D 2260/2212* (2013.01); *Y02T 50/675* (2013.01)

(58) Field of Classification Search
CPC .... F02K 1/40; F02K 1/386; F05D 2260/2212; F05D 2240/127; Y02T 50/675
See application file for complete search history.

(56) References Cited

U.S. PATENT DOCUMENTS

| | | | |
|---|---|---|---|
| 2,882,992 A | 4/1959 | Hausmann | |
| 3,048,376 A * | 8/1962 | Howald | F02K 1/386 366/262 |
| 3,289,413 A * | 12/1966 | Gist, Jr. | F02K 1/386 366/337 |
| 4,165,609 A | 8/1979 | Rudolph | |
| 4,217,756 A | 8/1980 | Laskody | |
| 4,516,660 A * | 5/1985 | Greenlaw | F02K 1/46 181/215 |
| 5,771,681 A * | 6/1998 | Rudolph | F02K 1/386 239/265.37 |

(Continued)

FOREIGN PATENT DOCUMENTS

WO WO 2008/143556 A1 11/2008

OTHER PUBLICATIONS

French Preliminary Search Report issued Nov. 27, 2013 in French Application 13 51379, filed on Feb. 18, 2013 (with English Translation of Categories of Cited Documents).

*Primary Examiner* — Igor Kershteyn

(74) *Attorney, Agent, or Firm* — Oblon, McClelland, Maier & Neustadt, L.L.P.

(57) ABSTRACT

A method of mixing in a discharge conduit, in a turbine engine with two or more flows, of a primary flow and a secondary flow, the two flows emerging in the discharge conduit by two coaxial ducts, separated by an internal housing which has an end downstream relative to the flow direction of the flows, the two coaxial ducts each being defined between an internal wall and an external wall, upstream of the downstream end of the internal housing, and the secondary flow surrounding the primary flow, is provided. The method includes disposing a divergent radial deflection device in the primary duct, spaced apart from the walls of the primary duct. A turbine engine including the deflection device is also provided.

14 Claims, 3 Drawing Sheets

(56) References Cited

U.S. PATENT DOCUMENTS

| | | | | |
|---|---|---|---|---|
| 5,941,065 A * | 8/1999 | Lidstone | ............... | F02K 1/085 |
| | | | | 181/215 |
| 7,043,898 B2 * | 5/2006 | Rago | ................ | F02K 1/386 |
| | | | | 181/220 |
| 7,299,635 B2 * | 11/2007 | Katheder | ............... | F02K 1/40 |
| | | | | 60/770 |
| 8,578,700 B2 * | 11/2013 | Khakhar | ............... | F02K 3/075 |
| | | | | 239/265.17 |
| 2010/0146980 A1 | 6/2010 | Stroem et al. | | |

\* cited by examiner

METHOD OF MIXING BETWEEN A PRIMARY FLOW AND A SECONDARY FLOW IN A TURBINE ENGINE, CORRESPONDING DEVICE AND TURBINE ENGINE

TECHNICAL FIELD

The present invention relates to turbine engines, wherein flows of very different thermodynamic characteristics meet in the conduits thereof. It relates more particularly to devices which accelerate the mixing in a conduit of jets originating from concentric ducts in order to homogenise the temperatures.

PRIOR ART

The invention relates to a configuration in which a primary flow coming from the turbine stages after the combustion chamber joins in a discharge conduit with a secondary flow arriving at the periphery. This type of configuration has a rotational symmetry about an axis LL', shown in FIG. 1. Hereafter an axial plane is defined as being a plane passing through this axis LL'. Likewise, the qualifiers "internal" and "external" are used in order to designate items which are respectively closer to and further from the axis LL'.

FIG. 1 gives an example of a turbojet engine exhibiting this configuration. The primary flow of gases which have passed through the combustion chamber are discharged after the turbine through a section forming a nozzle. Part of the energy recovered in the turbine is used in order to drive a blower which creates a supplementary pressure. The air accelerated by this blower forms a secondary flow which is guided in a duct surrounding the motor part. The two flows meet at the outlet of the primary duct in order to pass to the interior of a discharge conduit, formed here by the rear part of the cover.

This simplified configuration is not the only one. In the case of turbojet engines for supersonic aircraft, in particular, the shape of the tail cone may be more complex and the discharge conduit may open into a post-combustion stage. Moreover, the document FR 2 228 949 proposes variants of turbine engines with a blower after the mixing of the primary and secondary flows. The discharge conduit is not necessarily a nozzle, in certain configurations the confluence leads downstream to a power turbine for example or to any other device.

In general it is important to mix the primary flow and the secondary flow as strongly as possible before the outlet of the discharge conduit for reasons of performance and of noise. These two flows exhibit very different thermodynamic conditions, the primary flow being much hotter and faster than the secondary flow.

Lobe mixers are known for example from FR 2 875 854 in which the cover at the outlet of the primary duct has a so-called daisy shape in order to favour the interpenetration of the flows (FIG. 2). This type of solution is widely used in order to homogenise the flow at the outlet of certain types of turbojet engine, in particular in order to attenuate the noise. It has already appeared insufficient for this objective, in particular during takeoff phases. Thus the document U.S. Pat. No. 5,157,916 describes an ejector, formed by lobes which can be unfolded from the tail cone and placed in the discharge conduit in order to force the mixture of the primary and secondary flows at the outlet of the discharge conduit. However, the corresponding device extends axially over a distance corresponding to several times the radius of the primary duct.

Hitherto, no solution makes it possible to obtain a marked homogenisation of the flow over short distances, in particular in order to avoid temperature peaks due to the primary flow.

DESCRIPTION OF THE INVENTION

The object of the invention is to drastically reduce the distance necessary in order to obtain strong mixing of the primary and secondary flows, more particularly in order to make the temperature peaks disappear.

The invention relates to a method of mixing in a discharge conduit, in a turbine engine with two or more flows, a primary flow and a secondary flow, the two flows emerging in said discharge conduit by two coaxial ducts, separated by an internal housing which has an end downstream relative to the flow direction of the flows, the two coaxial ducts being defined upstream of the downstream end of the internal housing by a primary duct in which the primary flow circulates and a secondary duct in which the secondary flow circulates, the secondary flow surrounding the primary flow, the method consisting of disposing at least one radial deflection means in the primary duct, spaced apart from the walls of said primary duct.

By being disposed at the end of the duct, the deflector causes a part of the primary flow, which disrupts the secondary flow opposite its outlet orifice, to stream out in a divergent manner. By diverting a part of the hot primary flow towards the secondary flow, this radial impulse accelerates the thermal exchanges between the two flows. Moreover, the discharge conduit participates in the mixing process by preventing the secondary flow from escaping radially. In addition, the presence of the discharge conduit forces the overall flow to be directed downstream.

This deflection means, spaced apart from the walls of the primary duct, is thus placed in the middle of the primary flow, it imposes a deflection on a part of the primary flow which is much greater than if it were placed against a wall.

Moreover, the invention is preferably implemented by organising an alternation, azimuthally around the axis of the ducts, of zones where the primary flow is deflected and zones where it is not deflected. By this method, while the primary flow is spaced apart from the axis on one sector, the secondary flow converges towards the axis on a neighbouring sector. Advantageously, this flow pattern avoids the formation of a stopper in front of the outlet of the secondary flow and creates an effect of interpenetration of the flows, similar to that of lobe mixers.

The invention also relates to a turbine engine with two or more flows, comprising at least one primary flow and one secondary flow, the two flows emerging in a discharge conduit by two coaxial ducts, separated by an internal housing which has an end downstream relative to the flow direction of the flows, the two ducts being defined upstream of the downstream end by a primary ducts in which the primary flow circulates and a secondary duct in which the secondary flow circulates, the secondary flow surrounding the primary flow. Such a turbine engine is remarkable because it is equipped with a device including at least one divergent radial deflection means disposed in the primary duct, spaced apart from the walls of said primary duct, the device also including at least one fixing means capable of positioning said deflection means in said primary duct.

Advantageously, said device includes a plurality of divergent radial deflection means, said means being distributed azimuthally around the axis of the primary duct, leaving angular sectors where the primary flow is free. This arrangement makes it possible to organise the alternation of the azimuthal deflections.

The deflection means is preferably constituted by an aileron of which the profile, in at least one axial plane of the primary duct passing through said aileron, is cambered in the opposite direction to the axis of the primary duct.

On the one hand, it is possible to define the profile of such ailerons in order to minimise the losses of pressure and the drag. On the other hand, this embodiment reveals a complementary mixing effect. In fact, these ailerons create marginal turbulence, at the end of the span, and possibly at corners, at the intersection with the fixing means, which participate in the mixing process.

The device is particularly adapted to the case where the primary flow, being passed through the combustion chamber, has a radial temperature profile with a maximum spacing from the walls of the primary duct. Advantageously, with a view to drastically reducing the temperature peaks downstream, the deflection means are positioned in such a way that their upstream end is located on a lesser radius than that of the maximum temperatures.

This configuration achieves its purpose because the secondary flow is cold. Moreover, the radial profile of the temperatures in the flow achieves a maximum, quite flat, towards the mean radius. By placing the deflectors below this zone, this is therefore the hottest region of the primary flow which is forced to mix as a priority with the cold air of the secondary flow.

Advantageously, the invention relates to a turbine engine comprising structural arms in the primary duct holding the internal housing and in which each structural arm constitutes the means for fixing a deflection means. In a particular embodiment, an aileron forms the deflection means and this aileron can extend symmetrically on either side of the structural arm.

In an embodiment adapted to the implementation of the method with alternation of zones for deflection of the primary flow and zones where the secondary flow can pass through freely, the cross-section of the primary duct is circular and the deflection means are distributed angularly around the axis of the flow in a periodic manner, the angular extension of each deflection means being equal to a half-period.

For the purpose of further increasing the exchanges of temperature, a variant of the device includes a means for extracting air in the secondary flow and at least one conduit for this extracted air emerging on the trailing edge of each radial deflection means.

Taking into account the position of the deflection means, particularly the ailerons, this device introduces cold air in the hottest part of the flow, taking advantage of the azimuthal angular extension of the ailerons in order to homogenise the mixture. Advantageously, the means of extracting air is formed by a scoop which is placed in the secondary flow and passes through the internal housing. When the turbine engine comprises in the primary duct structural arms holding the internal housing, said conduit conveying the extracted air may be formed by a pipeline passing through in a structural arm.

Preferably, at least one means for fixing said at least one deflection means connects said deflection means to a first wall and also to a second wall delimiting the primary duct, said first wall being constituted by a part of a wall of a central body of the turbine engine and said second wall being constituted by a wall of the internal housing. In an alternative embodiment, a ferrule holds the ailerons which each constitute a so-called deflection means, the ferrule itself being maintained by rods connected to said first wall and second wall of the primary duct.

DESCRIPTION OF ONE EMBODIMENT OF THE INVENTION

A non-limiting embodiment of the invention will now be described in greater detail with reference to the appended drawings, in which.

Figure 1:
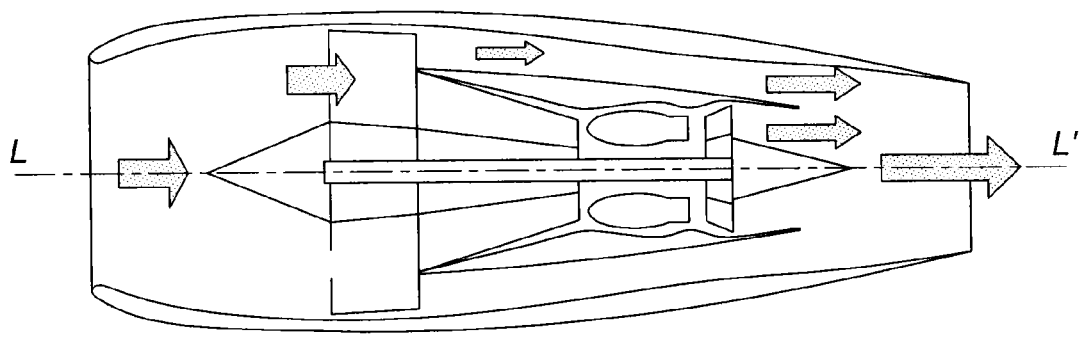
FIG. 1 shows an example of a turbojet engine where the primary and secondary flows mix in a discharge conduit.
Figure 2:
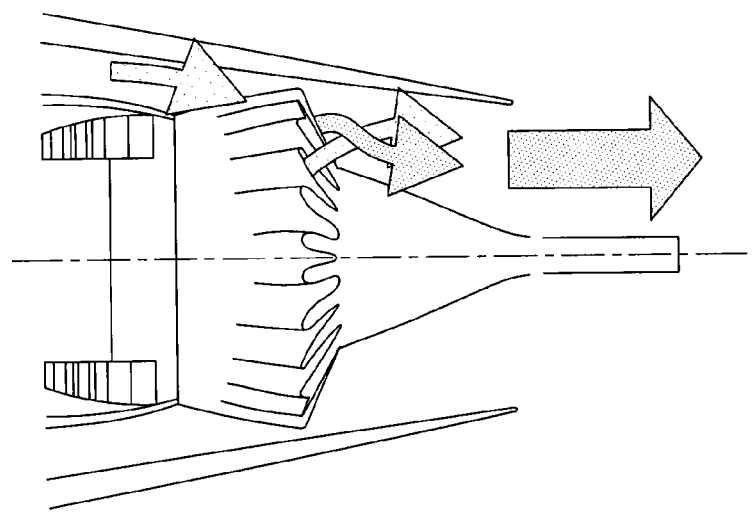
FIG. 2 shows a mixer according to the prior art.
Figure 3:
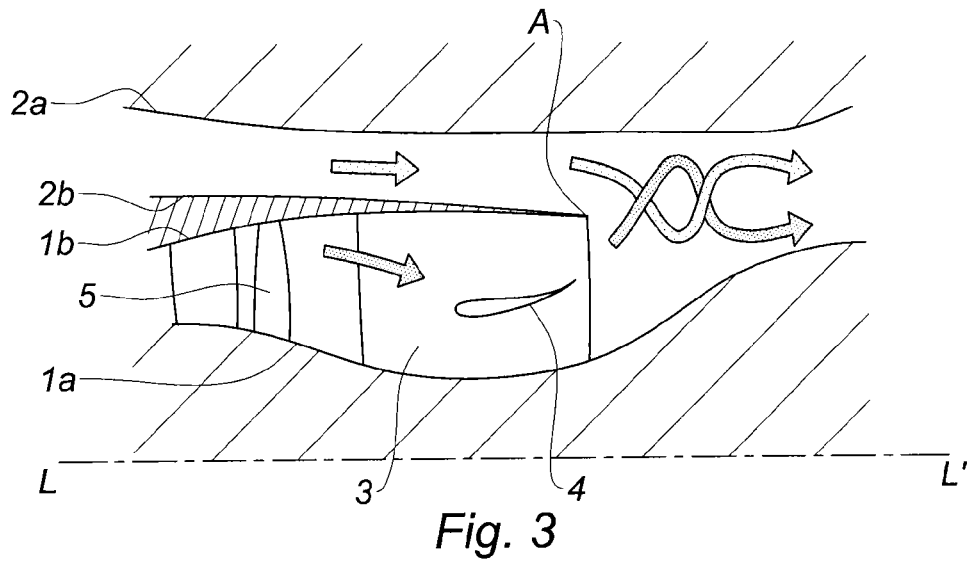
FIG. 3 shows a cross-section in an axial plane of a turbine engine installation equipped with the invention.

An embodiment of the device is shown in FIG. 3 for a turbine engine having a rotational symmetry about an axis LL' in the zone where the mixing device is applied. This shows a central body delimited by a wall $1a$-$1'a$, an internal housing delimited by the walls $1b$ and $2b$, and an external housing delimited internally by the wall $2a$-$2'a$. The flows in the installation go from left to right. Thus the stop A where the walls $1b$ and $2b$ meet defines the downstream end of the internal housing. Upstream of A the walls $1a$ and $1b$ define a primary duct corresponding to the outlet of a primary flow passed through the combustion chamber. Upstream of the point A the walls $2a$ and $2b$ define a secondary duct through which a secondary flow passes. Downstream of A the walls $1'a$ and $2'a$ define a discharge conduit where the two flows mix before exiting the conduit.

Without a particular device, the two flows arrive with substantially parallel components in the axial plane in the region of their confluence, at A. However, their thermodynamic characteristics are different. In particular the temperature, which in this case is the main characteristic to be homogenised, is much higher in the primary flow than in the secondary flow (typically 1000° K. as against 400° K.).

The present device is based on the idea of redirecting the hottest part of the primary flow towards the secondary flow which is cold.

For this purpose, as deflection means ailerons 4 are used which are positioned inside the primary duct, near the downstream end thereof, perpendicular to the axial plane passing through the centre thereof and aerodynamically profiled in this axial plane in order to deflect the primary flow towards the external wall $2'a$ of the discharge conduit. These deflecting ailerons deflector are distributed angularly around the axis LL' leaving angular sectors free between them.

Fixing means 3 hold the deflection means in the chosen position, spaced from the walls of the primary duct. In a typical embodiment for a turbine engine the internal housing is held near its downstream end by structural arms 3, situated in the primary duct after the low-pressure turbine. These structural arms extend radially in the primary duct between the internal walls (1a) and external walls (1b) and have a profiled shape with respect to the flow. Preferably, the invention uses these arms in order to fix the ailerons in their centre and thus to avoid the addition of supplementary structures which cause pressure losses in the flow. However, in a configuration where the structural arms are remote from the outlet of the duct a ferrule holding the ailerons, the ferrule itself being held by rods connected to said first wall and second wall of the primary duct, constitutes an modified embodiment of the these fixing means.

These deflecting ailerons have three roles:
  to redirect the hot flow towards the coldest parts in order to homogenise the temperatures downstream of the confluence;
  likewise to enable the cold secondary flow to converge towards the interior of the hot flow in the discharge conduit in the angular sectors where the deflectors are not included, and thus to cool the lower part of the flow;
  to create marginal turbulence, at the end of the span, and possibly at corners, at the junction thereof with the fixing means, which increase the surface areas of exchanges between flows and improves the mixing and the thermal exchange.

These deflecting ailerons each have individually an azimuthally limited angular extension about the axis LL'. This makes it possible in a preferred embodiment to give them a simple cylindrical shape perpendicular to the axial plane in the duct passing through the centre thereof, with a constant profile over the span. In fact, the objective is to have an aerodynamically profiled aileron, with a low incidence on the leading edge over all of the flow encountered, in order to minimise the pressure losses at the given deflection angle. It is the camber of the profile towards the exterior with respect to the axis LL' in the axial plane of the duct which deflects the primary flow. In an alternative embodiment, however, it may be envisaged to curve these ailerons over the span about the axis LL' in order to accompany the geometry of the nozzle, in particular in a configuration where each aileron individually covers a considerable angular sector.

Figure 4:
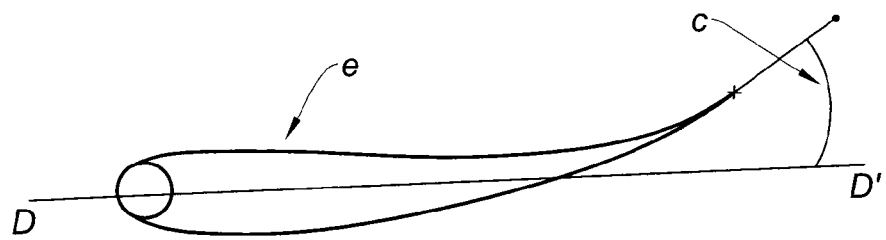
FIG. 4 shows the profile of a deflecting aileron in the axial plane.

The optimisation of the shape of the ailerons is effected by calculation in the geometry of the installation with a view to obtaining the most homogeneous possible temperature profile at a given distance downstream of the outlet of the duct. One way of proceeding is to use the profiles of NACA type with a camber which is defined by several parameters, such as their orientation DD' with respect to the axis LL', the camber angle c, the thickness e (see FIG. 4).

Figure 5:
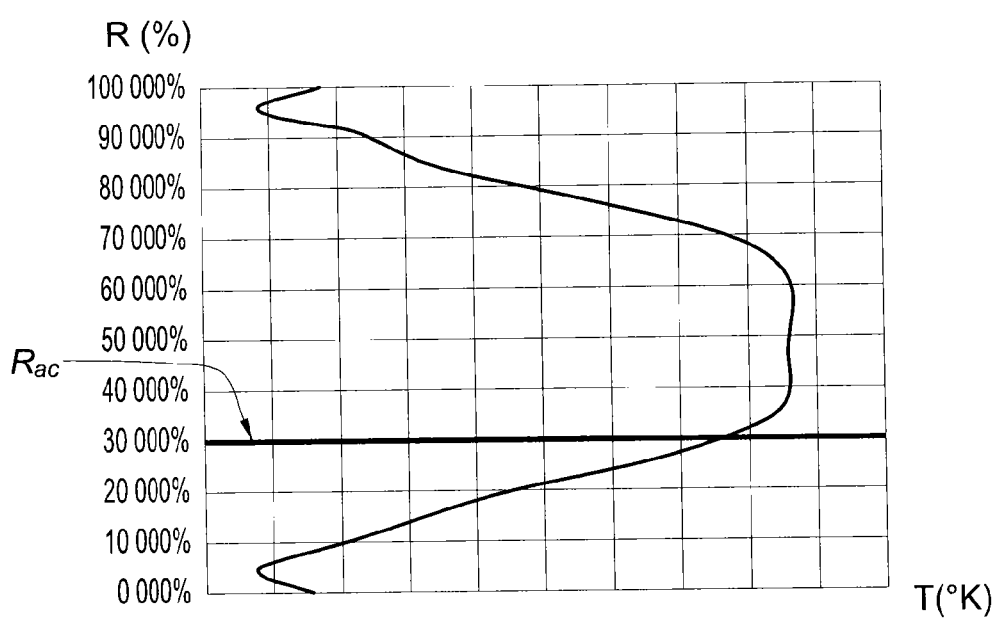
FIG. 5 shows an example of a radial profile of the temperatures in the flow of the primary duct.

Other parameters are involved in the optimisation, in particular the radial position of these deflecting ailerons. It is desirable that the aileron directs the hottest part of the primary flow towards the exterior at the outlet of the primary duct in the discharge conduit. FIG. 5 shows a typical radial distribution of the temperatures T for a primary flow at the outlet of the low-pressure turbine. The radius y is given as a percentage of the width of the duct between the internal wall 1a and the external wall 1b. The temperature profile of the primary flow has a maximum in the radial direction, substantially towards the middle of the duct. By positioning the leading edge of the deflector at a radius $R_{ac}$ less than those corresponding to the hottest zone in the temperature profile of the fluid coming from the low-pressure turbine, the entire hot zone of the primary flow in the sector of the deflector is redirected towards the cold zone. In the example presented, the leading edge of the aileron is positioned at a radius $R_{ac}$ corresponding to 30% of the width of the duct, starting from the internal wall 1a. Of course this radial position may be the subject of optimisations.

Figure 6:
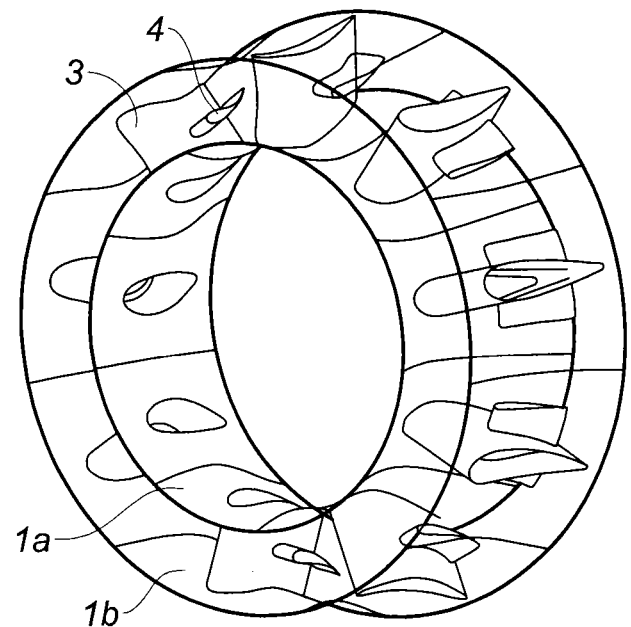
FIG. 6 shows a perspective view of the downstream zone of the primary duct with the ailerons mounted on the structural arms.

The azimuthal periodicity of the device and the span of the ailerons also constitute parameters which influence the effectiveness of the device. FIG. 6 shows in perspective the end of the primary duct with a particular periodic configuration where the structural arms are distributed every 40° about the axis LL', the azimuthal angular extension of the deflecting aileron being 20°. This distribution therefore creates an alternation of sectors of 20° about the axis LL' between which the flow will be deflected or not towards the exterior, at the outlet of the duct. Of course this is a particular implementation adapted to certain production constraints of the turbine engine. It forms part of the invention to adapt the principle of azimuthal alternation of the zones of deviation to the constraints specific to the turbine engine in question. Likewise, the size of these sectors in order to improve the effects of mixing is effected by calculating the flow obtained for various geometries in compliance with these design constraints.

Figure 7:
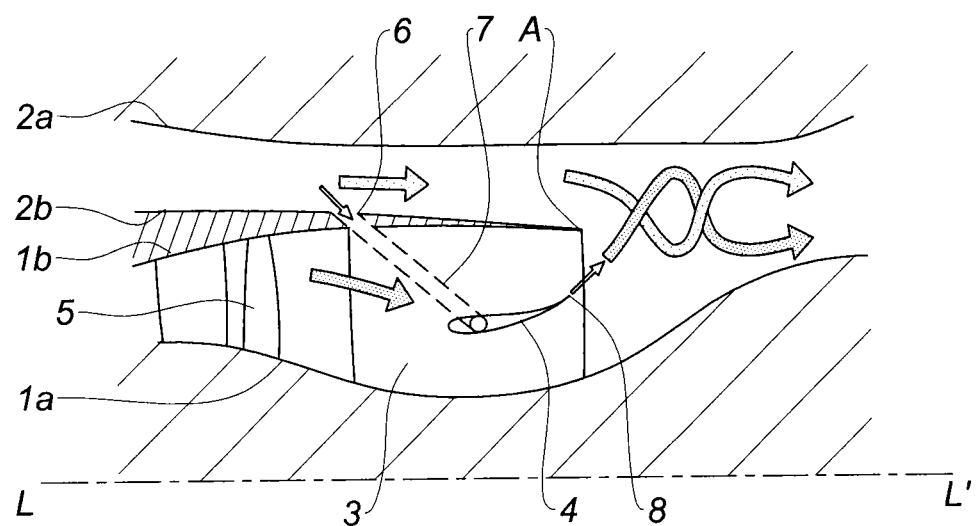
FIG. 7 shows a cross-section in an axial plane of an alternative embodiment with blowing of secondary air at the end of the aileron.

In an alternative embodiment of the device it is also possible to add an effect of mixing between the two flows. In the design of turbine engines it is known, see for example FR 2 626 044, to use scoops for extracting part of a flow in a duct for various purposes. In the present variant, shown on FIG. 7, a scoop 6 is placed in the secondary flow upstream of the position of the ailerons 4 and downstream of the position of the last stage 5 of the low-pressure turbine. Conveyed by ancillary pipelines 7 passing through in the structural arms 3, this cold air is injected in the primary flow at the trailing edge 8 of the ailerons. This configuration has the advantage of increasing the contact surface area between the flows and distributing this complementary mixing surface azimuthally. In addition, as has been seen, the ailerons are placed in the region of the duct where the primary flow is hottest. Therefore the thermal exchanges are increased accordingly.

In a second modified embodiment, this device is combined with a modification of the surfaces 1b and 2b in such a way as to create lobes at the rear of the internal housing in the region of the confluence. In this case, the shape of the lobes is adjusted in such a way as to amplify the alternation between angular sectors of convergence and divergence imposed by the deflectors (4).

The invention claimed is:

1. A method of mixing in a discharge conduit in a turbine engine with two flows being a primary flow and a secondary flow, the two flows emerging in said discharge conduit by two coaxial ducts, separated by an internal housing which has a downstream end, the two coaxial ducts being defined upstream of the downstream end of the internal housing by a primary duct in which the primary flow circulates and a secondary duct in which the secondary flow circulates, the secondary flow surrounding the primary flow, the method comprising:
  disposing a divergent radial deflection means in the primary duct, spaced apart from walls of said primary duct.

2. The method of mixing according to claim 1, wherein an alternation is organized azimuthally around an axis of the ducts between first zones where the primary flow is deflected and second zones where the primary flow is not deflected.

3. A turbine engine with two flows, comprising:
  a primary flow and a secondary flow, the two flows emerging in a discharge conduit by two coaxial ducts, separated by an internal housing which has a downstream end, the two coaxial ducts being defined upstream of the downstream end by a primary duct in which the primary flow circulates and a secondary duct in which the secondary flow circulates, the secondary flow surrounding the primary flow; and a device including a divergent radial deflection means disposed in the primary duct, spaced apart from walls of said primary duct, and a fixing means for positioning said deflection means in said primary duct.

4. The turbine engine according to claim 3, including a plurality of divergent radial deflection means distributed azimuthally around an axis of the primary duct.

5. The turbine engine according to claim 3, wherein the deflection means is constituted by an aileron of which a profile, in at least one axial plane of the primary duct passing through said aileron, is cambered in an opposite direction to an axis of the primary duct.

6. The turbine engine according to claim 3, having a radial temperature profile of the primary flow with a maximum spacing of the walls of the primary duct, wherein the deflection means is positioned in such a way that an upstream end thereof is located at a radius less than that of a maximum temperature.

7. The turbine engine according to claim 3, comprising structural arms in the primary duct holding the internal housing, the structural arms constituting the fixing means.

8. The turbine engine according to claim 7, wherein the deflection means is an aileron which extends symmetrically on either side of the structural arm.

9. The turbine engine according to claim 8, wherein a cross-section of the primary duct is circular and the deflection means are distributed angularly around an axis of the flow in a periodic manner, an azimuthal angular extension of each deflection means being equal to a half-period.

10. The turbine engine according to claim 4, including a means for extracting air in the secondary flow and a conduit for the extracted air emerging on a trailing edge of the radial deflection means.

11. The turbine engine according to claim 10, wherein the means for extracting air is formed by a scoop which is placed in the secondary flow and passes through the internal housing.

12. The turbine engine according to claim 10, comprising, in the primary duct, structural arms holding the internal housing, and wherein said conduit is formed by a pipeline passing through one of the structural arms.

13. The turbine engine according to claim 3, wherein at least one of the fixing means connects said deflection means to a first wall and to a second wall delimiting the primary duct, said first wall being constituted by a part of a wall of a central body of the turbine engine and said second wall being constituted by a wall of the internal housing.

14. The turbine engine according to claim 13, wherein a ferrule holds the ailerons which each constitute the deflection means, the ferrule being maintained by rods connected to said first wall and second wall of the primary duct.

* * * * *